US011376821B2

(12) United States Patent
Yoon et al.

(10) Patent No.: US 11,376,821 B2
(45) Date of Patent: Jul. 5, 2022

(54) METHOD FOR MANUFACTURING CURVED LAMINATED GLASS AND CURVED LAMINATED GLASS MANUFACTURED BY THE SAME

(71) Applicant: LG CHEM, LTD., Seoul (KR)

(72) Inventors: Jae Hyuk Yoon, Daejeon (KR); Jun Hak Oh, Daejeon (KR); Ho Seong Kang, Daejeon (KR); Chang Hee Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/954,456

(22) PCT Filed: Jan. 8, 2019

(86) PCT No.: PCT/KR2019/000247
§ 371 (c)(1),
(2) Date: Jun. 16, 2020

(87) PCT Pub. No.: WO2019/139324
PCT Pub. Date: Jul. 18, 2019

(65) Prior Publication Data
US 2021/0078304 A1 Mar. 18, 2021

(30) Foreign Application Priority Data
Jan. 10, 2018 (KR) .................. 10-2018-0003484

(51) Int. Cl.
*B32B 17/10* (2006.01)
*B32B 7/022* (2019.01)
(Continued)

(52) U.S. Cl.
CPC ........ *B32B 17/10935* (2013.01); *B32B 7/022* (2019.01); *B32B 17/10036* (2013.01);
(Continued)

(58) Field of Classification Search
CPC .............. B32B 17/10935; B32B 7/022; B32B 17/10036; B32B 17/10761; C03C 3/087; C03C 27/20
(Continued)

(56) References Cited

U.S. PATENT DOCUMENTS 3,078,693 A    2/1963   Lytle
2009/0321005 A1* 12/2009 Higuchi ................ B32B 27/32
                                                 156/249
(Continued)

FOREIGN PATENT DOCUMENTS

EP    3450161 A1    3/2019
EP    3712119 A1    9/2020
(Continued)

*Primary Examiner* — Tahseen Khan
(74) *Attorney, Agent, or Firm* — Dentons US LLP

(57) ABSTRACT

The present disclosure relates to a method for manufacturing curved laminated glass and curved laminated glass manufactured by the same. The method includes providing a curved thick plate glass; providing a thin plate glass whose thickness is smaller than that of the curved thick plate glass; stacking a support film comprising a ductile layer and an elastic layer on one surface of the thin plate glass; positioning a lamination film or a bonding agent between the other surface of the thin plate glass and a concave surface of the curved thick plate glass; and laminating the thin plate glass so as to be aligned with a concave surface of the curved thick plate glass by elastically deforming the thin plate glass provided with the support film.

15 Claims, 3 Drawing Sheets

(51) Int. Cl.
*C03C 3/087* (2006.01)
*C03C 27/10* (2006.01)
(52) U.S. Cl.
CPC ........ *B32B 17/10761* (2013.01); *C03C 3/087* (2013.01); *C03C 27/10* (2013.01); *B32B 2307/54* (2013.01); *B32B 2307/732* (2013.01)
(58) Field of Classification Search
USPC .......................................................... 428/174
See application file for complete search history.

(56) References Cited

U.S. PATENT DOCUMENTS

| | | | | |
|---|---|---|---|---|
| 2011/0181820 | A1* | 7/2011 | Watanabe | G02B 5/26 349/115 |
| 2013/0295357 | A1 | 11/2013 | Cleary et al. | |
| 2013/0305912 | A1* | 11/2013 | Weinhold | B32B 17/10045 89/36.02 |
| 2014/0141206 | A1 | 5/2014 | Gillard et al. | |
| 2019/0134953 | A1* | 5/2019 | Oh | C03B 23/0302 |

FOREIGN PATENT DOCUMENTS

| | | |
|---|---|---|
| JP | 2001-521480 A | 11/2001 |
| JP | 2010-194874 A | 9/2010 |
| JP | 2014527011 A | 10/2014 |
| JP | 2016-052990 A | 4/2016 |
| JP | 2017048075 A | 3/2017 |
| JP | 3221451 U | 5/2019 |
| KR | 10-2016-0061326 A | 5/2016 |
| KR | 10-2017-0122132 A | 11/2017 |
| WO | 2012166343 A2 | 12/2012 |
| WO | 2015146920 A1 | 10/2015 |
| WO | WO-2017188686 A1 * 11/2017 ....... B32B 17/10119 |  |

* cited by examiner

[Figure 1]
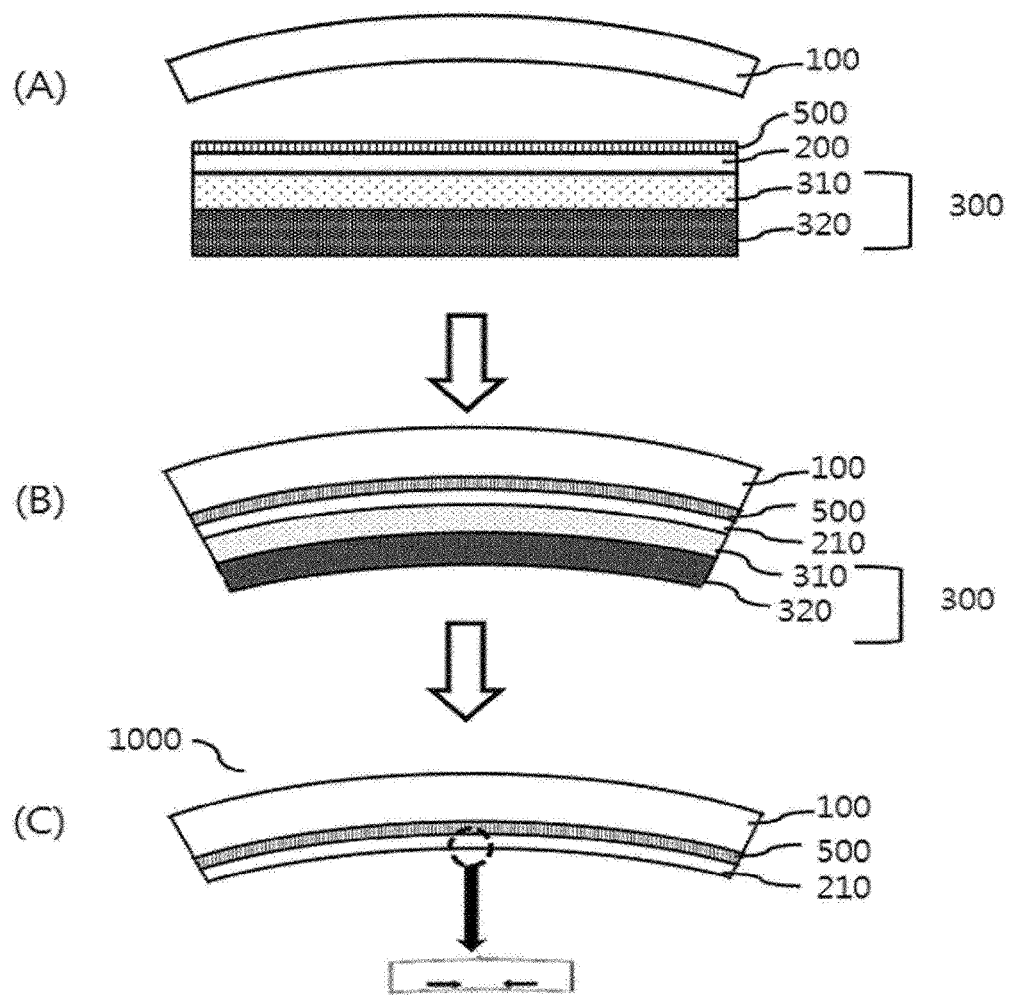

[Figure 2]
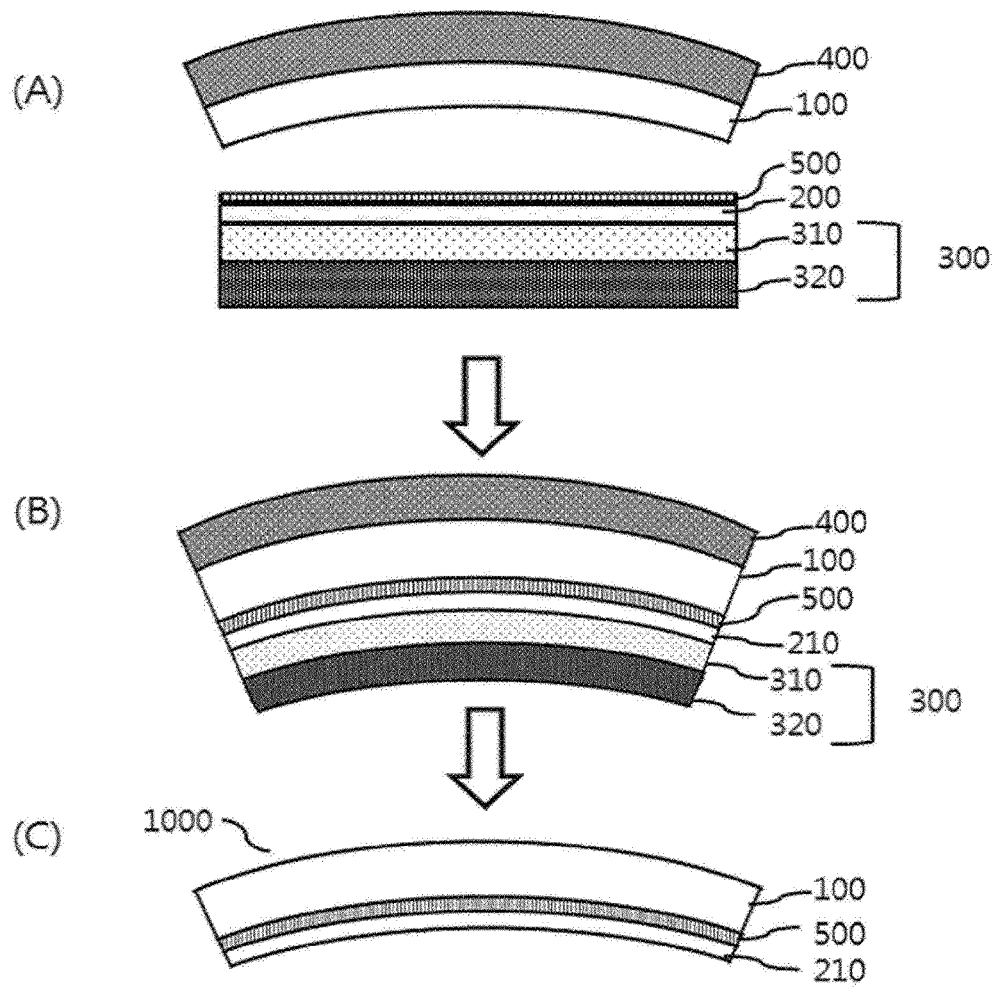

[Figure 3]
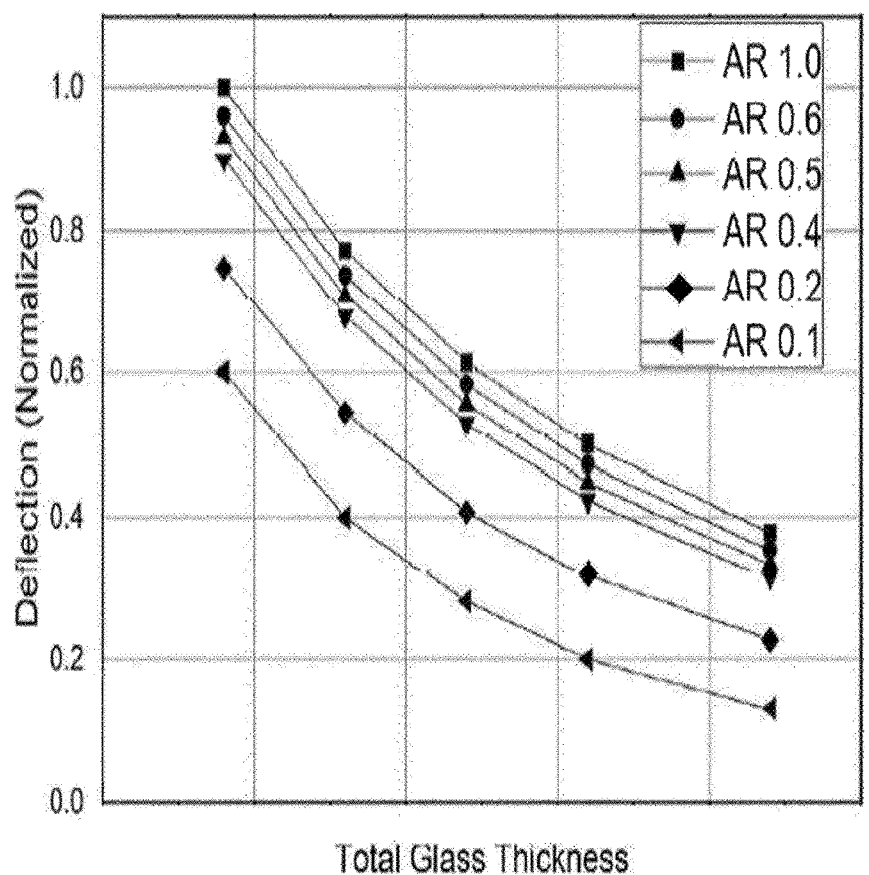

METHOD FOR MANUFACTURING CURVED LAMINATED GLASS AND CURVED LAMINATED GLASS MANUFACTURED BY THE SAME

The present application is a National Phase entry pursuant to 35 U.S.C. § 371 of International Application No. PCT/KR2019/000247 filed on Jan. 8, 2019, and claims priority to and the benefit of Korean Patent Application No. 10-2018-0003484 filed in the Korean Intellectual Property Office on Jan. 10, 2018, the entire contents of which are incorporated herein by reference.

TECHNICAL FIELD

The present invention relates to a method for manufacturing curved laminated glass and curved laminated glass manufactured by the same.

BACKGROUND ART

Glass is a material that has been applied to various living spaces due to the unique transparency thereof. In particular, laminated glass in which two sheets of glass are laminated is used, and curved laminated glass in the form of a bent shape forming a curved surface according to the purpose for which glass is used. Further, in order to reduce the volume and weight of curved laminated glass, curved laminated glass is manufactured by using thick plate glass and thin plate glass.

In order to manufacture curved laminated glass, self-weight molding, compression molding and cold molding methods have been generally used. The self-weight molding is a method of using a molding frame that fixes the edge of glass, increasing the temperature around the softening point of glass to be molded, molding the glass by using a phenomenon in which glass is sagging due to the self-weight of glass, and then laminating the molded glass. In addition, the compression molding is a method of molding glass to be molded in a state where glass is sufficiently heated by compressing the heated glass in a frame which is formed in a predetermined shape, and then laminating the molded glass. Furthermore, the cold molding is a method of disposing another glass on a concave surface of glass molded into a curved surface, molding another glass into a curved surface by using vacuum technology to elastically deform another glass, and then laminating the molded glass.

When thin plate glass is molded into a curved surface by using cold molding, the thin plate glass has a small thickness compared to the area, so that during a process in which the thin plate glass is elastically deformed, a buckling phenomenon occurs or wrinkles occur on the thin plate glass. In particular, the smaller the ratio of thickness to width of thin plate glass is, the more frequently the buckling phenomenon occurs or wrinkles occur on thin plate glass molded into a curved surface.

Therefore, there is a need for a technology of manufacturing curved laminated glass in which the buckling phenomenon or wrinkles is or are suppressed from occurring on thin plate glass even when the thin plate glass is subjected to cold molding.

DETAILED DESCRIPTION OF INVENTION

Technical Problem

The present specification has been made in an effort to provide a method for manufacturing curved laminated glass and curved laminated glass manufactured by the same.

However, a problem to be solved by the present invention is not limited to the aforementioned problem, and other problems that are not mentioned may be clearly understood by a person skilled in the art from the following description.

Technical Solution

An exemplary embodiment of the present invention provides a method for manufacturing curved laminated glass, the method including: providing curved thick plate glass; providing thin plate glass whose thickness is smaller than that of the curved thick plate glass; stacking a support film including a ductile layer and an elastic layer on one surface of the thin plate glass; positioning a lamination film or a bonding agent between the other surface of the thin plate glass and a concave surface of the curved thick plate glass; and laminating the thin plate glass so as to be aligned with the concave surface of the curved thick plate glass by elastically deforming the thin plate glass provided with the support film.

Further, another exemplary embodiment of the present invention provides curved laminated glass manufactured by the method for manufacturing curved laminated glass.

Advantageous Effects

A method for manufacturing curved laminated glass according to an exemplary embodiment of the present invention may effectively suppress a buckling phenomenon or wrinkles that may occur on thin plate glass having a small thickness, which is molded into a curved surface even when the thin plate glass is elastically deformed.

A method for manufacturing curved laminated glass according to an exemplary embodiment of the present invention may provide curved laminated glass which is excellent in optical quality.

According to an exemplary embodiment of the present invention, it is possible to provide curved laminated glass which has a small radius of curvature and is lightweight and thinned.

BRIEF DESCRIPTION OF DRAWINGS

FIG. 1 is a view illustrating a method for manufacturing curved laminated glass according to an exemplary embodiment of the present invention.

FIG. 2 is a view illustrating a method for manufacturing curved laminated glass by using a fracture prevention layer according to an exemplary embodiment of the present invention.

FIG. 3 is a view illustrating a result of securing rigidity according to the thickness ratio of curved thick plate glass to curved thin plate glass according to an exemplary embodiment of the present invention.

BEST MODE

Throughout the specification of the present application, when one part "includes" one constituent element, unless otherwise specifically described, this does not mean that another constituent element is excluded, but means that another constituent element may be further included.

Throughout the specification of the present application, when one member is disposed "on" another member, this includes not only a case where the one member is brought into contact with another member, but also a case where still another member is present between the two members.

Throughout the specification of the present application, the unit "wt %" may mean a weight ratio of a component included in a member based on the total weight of the member.

Throughout the specification of the present application, "radius of curvature" of glass may mean a minimum value of a radius of an arc which is closest to a curved surface along all directions from a minute point on the surface of glass molded into the curved surface, and the radius of curvature may be measured by scanning and modeling a surface of glass molded into a curved surface using a 3D scanner (Faro/Focus S), and the like. Through this, it is possible to measure the radius of curvature of glass having a single curved surface or glass having a double curved surface.

Throughout the specification of the present application, the "elastic modulus" of a member refers to a value obtained by fixing both ends of a sample prepared in accordance with JIS-K6251-1 standard, and then applying a force in a direction perpendicular to the thickness direction of the sample to measure the stress per unit area according to the strain, and in this case, as a measuring apparatus, a tensile strength meter (Zwick/Roell Z010 UTM), and the like may be used.

The present inventors found that when curved laminated glass was manufactured by using a support film including a ductile layer and an elastic layer to apply elastic deformation to thin plate glass having a small thickness, it was possible to suppress a buckling phenomenon or wrinkles that could occur on curved thin plate glass molded from the thin plate glass, thereby developing a method for manufacturing curved laminated glass as described below.

Hereinafter, the present specification will be described in more detail.

An exemplary embodiment of the present invention provides a method for manufacturing curved laminated glass, the method including: providing curved thick plate glass; providing thin plate glass whose thickness is smaller than that of the curved thick plate glass; stacking a support film including a ductile layer and an elastic layer on one surface of the thin plate glass; positioning a lamination film or a bonding agent between the other surface of the thin plate glass and a concave surface of the curved thick plate glass; and laminating the thin plate glass so as to be aligned with the concave surface of the curved thick plate glass by elastically deforming the thin plate glass provided with the support film.

A method for manufacturing curved laminated glass according to an exemplary embodiment of the present invention may effectively suppress a buckling phenomenon or wrinkles that may occur on thin plate glass having a small thickness, which is molded into a curved surface even when the thin plate glass having a small thickness is elastically deformed.

According to an exemplary embodiment of the present invention, it is possible to stack the support film including the ductile layer and the elastic layer on one surface of the thin plate glass. The same effect as an increase in thickness of the thin plate glass may be implemented by stacking the thin plate glass on the support film. When elastic deformation is applied to thin plate glass having a small thickness, the thin plate glass has a small ratio of thickness to width, so that a buckling phenomenon or wrinkles may occur on thin plate glass molded into a curved surface (hereinafter, referred to as curved thin plate glass). In particular, the smaller the thickness of the thin plate glass is, the more serious the buckling phenomenon or wrinkles occurring on curved thin plate glass to be manufactured may become.

In contrast, according to an exemplary embodiment of the present invention, the thin plate glass may be molded into a curved surface by stacking the thin plate glass on the support film and elastically deforming the thin plate glass. That is, during the process of applying elastic deformation to the thin plate glass provided with the support film, elastic deformation may be applied to the thin plate glass similarly to the case where elastic deformation is applied to thick plate glass having a large thickness. Specifically, the same effect as an increase in ratio of thickness to width of the thin plate glass may be implemented by providing the support film on the thin plate glass, thereby effectively suppressing a buckling phenomenon or wrinkles that may occur on curved thin plate glass manufactured by elastically deforming the thin plate glass. Furthermore, during the process of elastically deforming the thin plate glass provided with the support film, the support film may support the thin plate glass, thereby more effectively suppressing a buckling phenomenon or wrinkles from occurring on thin plate glass which is molded into a curved surface.

Accordingly, according to an exemplary embodiment of the present invention, it is possible to provide curved laminated glass having excellent quality, in which the occurrence of the buckling phenomenon or wrinkles is suppressed, as compared to the cold molding method in the related art.

According to an exemplary embodiment of the present invention, the providing of the curved thick plate glass may mold thick plate glass into a curved surface by using a method of molding glass into a curved surface, which is publicly-known in the art. As an example, curved thick plate glass may be manufactured by using a self-weight molding method or a compression molding method.

According to an exemplary embodiment of the present invention, soda lime glass may be used as the thick plate glass. Specifically, as the thick plate glass, glass typically used as window glass of a transportation means may be adopted and used without particular limitation. As an example, it is possible to use, as the thick plate glass, soda lime glass which is formed from a composition including 65 wt % to 75 wt % of $SiO_2$, 0 wt % to 10 wt % of $Al_2O_3$, 10 wt % to 15 wt % of $NaO_2$, 0 wt % to 5 wt % of $K_2O$, 1 wt % to 12 wt % of CaO, and 0 wt % to 8 wt % of MgO based on 100 wt % of the composition. Further, as the thick plate glass, it is possible to use, as the thick plate glass, soda lime glass manufactured by a float method using a float bath and soda lime glass manufactured by a down draw method or a fusion method.

According to an exemplary embodiment of the present invention, as the thin plate glass, glass typically used as window glass of a transportation means may be adopted and used without particular limitation. Specifically, as the thin plate glass, alkali-free glass may be used.

As an example, it is possible to use, as the thin plate glass, alkali-free glass which is formed from a composition which includes 46 wt % to 62 wt % of $SiO_2$, 15 wt % to 29 wt % of $Al_2O_3$, 3 wt % to 14 wt % of MgO, 5 wt % to 16 wt % of CaO, and 0.01 wt % to 5 wt % of SrO, based on 100 wt % of the composition, and substantially contains no alkali metal oxide.

The composition which substantially contains no alkali metal oxide may mean a case where an alkali metal oxide is not included in glass at all, or the alkali metal oxide is partially included, but the content thereof is so slight that an amount of alkali metal oxide, which is negligible as a composition component of glass, is included, and the like as compared to other components. For example, the term "substantially" may mean a case where in a process of manufacturing glass, a trace of alkali metal element inevitably incorporated into glass from refractory materials, which are brought into contact with melt glass, impurities in a glass raw material, and the like is contained.

According to an exemplary embodiment of the present invention, as the alkali-free glass which may be used as the thin plate glass, it is possible to use alkali-free glass containing less than 1% of alkali metal (Li, Na, K, and the like) oxide represented as mass percentage in terms of oxides. Further, as the thin plate glass, it is possible to use alkali-free borosilicate glass or alkali-free aluminoborosilicate glass. In addition, as the thin plate glass, it is possible to use glass manufactured by a float method, or glass manufactured by a down draw method or a fusion method.

According to an exemplary embodiment of the present invention, the thin plate glass may have a thickness smaller than that of the thick plate glass. That is, the thickness of curved thin plate glass manufactured from the thin plate glass may be smaller than that of the curved thick plate glass. In addition, the thickness ratio of the thick plate glass to the thin plate glass may be 1:0.1 to 1:0.5. Specifically, the thickness ratio of the thick plate glass to the thin plate glass may be 1:0.15 to 1:0.45, 1:0.25 to 1:0.3, 1:0.15 to 1:0.25, or 1:0.3 to 1:0.45. By adjusting the thickness ratio of the thick plate glass to the thin plate glass within the above-described range, it is possible to effectively reduce the probability that curved laminated glass including the curved thick plate glass and the curved thin plate glass is fractured by a drop in rigidity. Further, it is possible to provide curved laminated glass having a smaller thickness.

According to an exemplary embodiment of the present invention, the thin plate glass may have a thickness of 0.3 mm to 1.0 mm. Accordingly, according to an exemplary embodiment of the present invention, it is possible to easily manufacture curved laminated glass including curved thin plate glass having a thickness of 0.3 mm to 1.0 mm, in which the occurrence of a buckling phenomenon or wrinkles is suppressed. Further, it is possible to easily manufacture curved laminated glass having a smaller thickness than that of curved laminated glass in the related art by using curved thin plate glass having a thickness of 0.3 mm to 1.0 mm.

According to an exemplary embodiment of the present invention, the laminating of the thin plate glass may apply elastic deformation to the thin plate glass provided with the support film. That is, during the process of elastically deforming the thin plate glass provided with the support film, the thin plate glass and the support film are elastically deformed and may be molded into a curved surface.

According to an exemplary embodiment of the present invention, the curved thick plate glass may have a single curved surface or a double curved surface. Specifically, the curved thick plate glass may be curved glass in the form of a single curved surface which is uniaxially molded and has a curvature only in one direction. In addition, the curved thick plate glass may be curved glass in the form of a double curved surface which is biaxially molded and has a curvature in multiple directions. As an example, the curved thick plate glass in the form of a double curved surface may be curved glass having a paraboloid.

Furthermore, the thin plate glass may be molded in the form of the curved thick plate glass while being elastically deformed. That is, the thin plate glass may be elastically deformed to be molded into curved glass having a single curved surface or curved glass having a double curved surface. Meanwhile, when thin plate glass is elastically deformed by the existing method to be molded into curved glass having a double curved surface, there is a problem in that the degree to which a buckling phenomenon and/or wrinkles occur on molded curved glass becomes severe. However, the method for manufacturing curved laminated glass according to an exemplary embodiment of the present invention may effectively prevent buckling and/or wrinkles from occurring on curved thin plate glass which is elastically deformed by stacking a support film on the thin plate glass and elastically deforming the thin plate glass.

Accordingly, the method for manufacturing curved laminated glass may easily manufacture curved laminated glass in the form of a single curved surface or a double curved surface.

The method for elastically deforming the thin plate glass provided with the support film is not particularly limited as long as the method is typically used in the art. As an example, the thin plate glass provided with the support film may be elastically deformed at a room temperature of approximately 20° C. to 35° C. through a compression process using a high temperature roller or vacuum ring/vacuum bag process.

According to an exemplary embodiment of the present invention, a lamination film or a bonding agent may be positioned between the other surface of the thin plate glass and the concave surface of the curved thick plate glass. Specifically, the lamination film or the bonding agent may be provided on the other surface of the thin plate glass, or the lamination film or the bonding agent may be provided on the concave surface of the curved thick plate glass. Through this, the thin plate glass molded into a curved surface may be laminated onto the concave surface of the curved thick plate glass. Specifically, through a lamination film or a bonding agent, a convex surface of the curved thin plate glass may be laminated to the concave surface of the curved thick plate glass.

According to an exemplary embodiment of the present invention, the lamination film may be single-layered or multi-layered. When a multi-layered lamination film is used, the compositions of the layers may be the same as or different from each other, and the thicknesses of the layers may be the same as or different from each other. The lamination film may be used by adopting a (co)polymer film formed of a material used when laminated glass is laminated in the art, such as a copolymer film of polyvinyl alcohol and polyvinyl butyral without particular limitation. As an example, the lamination film may include at least one of polyethylene, an ethylene acetic acid vinyl copolymer, polypropylene, polystyrene, a methacrylic resin, polyvinyl chloride, polyethylene terephthalate, polybutylene terephthalate, cellulose acetate, a diallyl phthalate resin, a urea resin, a melamine resin, unsaturated polyester, polyvinyl butyral, polyvinyl formal, polyvinyl alcohol, an acetic acid vinyl resin, an ionomer, polymethylpentene, vinylidene chloride, polysulfone, polyvinylidene fluoride, a methacryl-styrene copolymer resin, polyarylate, polyallyl sulfone, polybutadiene, polyether sulfone, and polyether ether ketone.

According to an exemplary embodiment of the present invention, the lamination film may have a thickness of 0.5 mm to 1 mm, but the thickness is not limited thereto. However, by adjusting the thickness of the lamination film within the above-described range, it is possible to prevent a problem in that the curved thick plate glass falls off from the curved thin plate glass due to insufficient bonding strength between the curved thin plate glass and the curved thick plate glass. Further, curved laminated glass which is thinned may be manufactured by adjusting the thickness of the lamination film within the above-described range.

According to an exemplary embodiment of the present invention, examples of the bonding agent may include an optically clear adhesive (OCA), a liquid optically clear adhesive (LOCA), or an optically clear resin (OCR). The curved thick plate glass may be laminated to the curved thin plate glass by applying the bonding agent to a thickness of 0.5 mm to 1.5 mm onto the concave surface of the curved thick plate glass or the convex surface of the curved thin plate glass.

According to an exemplary embodiment of the present invention, the thin plate glass provided with the support film may be elastically deformed to be aligned with and laminated to the concave surface of the curved thick plate glass. Accordingly, the curvature of the curved thin plate glass molded from the thin plate glass may be substantially the same as the curvature of the curved thick plate glass. The fact that the curvatures of glass is substantially the same as each other may mean not only a case where the curvatures of glass are completely the same as each other, but also a degree to which a slight difference occurs in the curvature of glass during the manufacturing process, but the slight difference does not affect the quality, optical properties, and the like. That is, the radius of curvature of the curved thin plate glass may be the same as the radius of curvature of the curved thick plate glass.

Further, the thin plate glass may be elastically deformed to be aligned with a concave surface of thick plate glass having a double curved surface, and may be molded into thin plate glass having a double curved surface. Through this, it is possible to manufacture laminated glass having a double curved surface which includes thick plate glass having a double curved surface and thin plate glass having a double curved surface.

According to an exemplary embodiment of the present invention, the support film including the ductile layer and the elastic layer may be easily elastically deformed, and during the process of elastically deforming thin plate glass, the support film may effectively support the thin plate glass which is elastically deformed. Through this, it is possible to effectively prevent a buckling phenomenon or wrinkles from occurring on the curved thin plate glass manufactured from the thin plate glass.

FIG. 1 is a view illustrating a method for manufacturing curved laminated glass according to an exemplary embodiment of the present invention. Specifically, FIG. 1(A) illustrates that a support film 300 including a ductile layer 310 and an elastic layer 320 is stacked on one surface of a thin plate glass 200, and a lamination film 500 is provided on the other surface of the thin plate glass 200. Further, FIG. 1(B) illustrates that thin plate glass 200 provided with a support film is elastically deformed to laminate curved thin plate glass 210 to curved thick plate glass 100. In addition, FIG. 1(C) is a view illustrating that curved laminated glass 1000 is finally manufactured by removing the support film 300 from the curved thin plate glass 210.

Referring to FIG. 1, as the thin plate glass 200 is elastically deformed, compression stress may be formed on a concave surface of the curved thin plate glass 210. Compression stress is formed on a concave surface of the curved thin plate glass, so that curved laminated glass to be manufactured may have excellent impact resistance and failure strength.

According to an exemplary embodiment of the present invention, the method for manufacturing curved laminated glass may further include providing a fracture prevention layer on a convex surface of the curved thick plate glass. The radius of curvature of the curved thick plate glass and the radius of curvature of the fracture prevention layer may be the same as each other. That is, the fracture prevention layer is molded into a curved surface, and a concave surface of the fracture prevention layer may be laminated onto a convex surface of the curved thick plate glass.

By providing a fracture prevention layer on the convex surface of the curved thick plate glass, the curved thick plate glass may be effectively prevented from being fractured during the process of elastically deforming the thin plate glass provided with the support film. Specifically, the thickness of a laminate in which a support film is proved on a thin plate glass may be larger than the thickness of the curved thick plate glass. When the thickness of the laminate is larger than the thickness of the curved thick plate glass, a problem in that the curved thick plate glass is fractured may occur during the process of elastically deforming the thin plate glass. In contrast, according to an exemplary embodiment of the present invention, a fracture prevention layer may be provided on a convex surface of the curved thick plate glass to prevent the curved thick plate glass from being fractured during the process of elastically deforming the thin plate glass.

According to an exemplary embodiment of the present invention, the fracture prevention layer may have a thickness of 1 mm or more. Specifically, the fracture prevention layer may have a thickness of 1 mm to 12 mm, 13 mm to 19 mm, or 20 mm to 25 mm. The curved thick plate glass may be effectively prevented from being fractured by using a fracture prevention layer having the above-described thickness range. Furthermore, the thickness of the fracture prevention layer may be adjusted by selecting a material for the fracture prevention layer. The fracture prevention layer may include at least one of a metal film, a ceramic film, and a polymer film, but the type of fracture prevention layer is not limited.

FIG. 2 is a view illustrating a method for manufacturing curved laminated glass by using a fracture prevention layer according to an exemplary embodiment of the present invention. Specifically, FIG. 2(A) illustrates that a support film 300 including a ductile layer 310 and an elastic layer 320 is stacked on one surface of a thin plate glass 200, a lamination film 500 is provided on the other surface of the thin plate glass 200, and a fracture prevention layer 400 molded into a curved surface is provided on a convex surface of curved thick plate glass 100. FIG. 2(B) illustrates that the thin plate glass 200 provided with a support film 300 is elastically deformed to laminate curved thin plate glass 210 to the curved thick plate glass 100. In addition, FIG. 2(C) is a view illustrating that curved laminated glass 1000 is finally manufactured by removing the support film 300 from the curved thin plate glass 210.

According to an exemplary embodiment of the present invention, a thickness ratio of the thin plate glass to the support film may be 1:1 to 1:50. Specifically, a thickness ratio of the thin plate glass to the support film may be 1:1 to 1:1.5, 1:3 to 1:12, or 1:14 to 1:50. By adjusting the thickness ratio of the thin plate glass to the support film within the above-described range, a buckling phenomenon or wrinkles may be effectively prevented from occurring on curved thin plate glass molded from the thin plate glass. Specifically, by adjusting the thickness ratio of the thin plate glass to the support film within the above-described range, a buckling phenomenon or wrinkles may be effectively suppressed from occurring on the curved thin plate glass. Further, the support film may be easily elastically deformed while supporting the thin plate glass.

According to an exemplary embodiment of the present invention, the ductile layer and the elastic layer may be sequentially provided on one surface of the thin plate glass. That is, the elastic layer, the ductile layer, and the thin plate glass may be sequentially stacked. When the thin plate glass is stacked on the ductile layer having an elastic modulus range and a thickness range as described below, the ductile layer may be more closely adhered to the thin plate glass which is elastically deformed and may support the thin plate glass during the process of elastically deforming the thin plate glass. Accordingly, according to an exemplary embodiment of the present invention, a buckling phenomenon or wrinkle may be more effectively suppressed from occurring on the curved thin plate glass by setting the sequence of stacking the elastic layer, the ductile layer, and the thin plate glass.

According to an exemplary embodiment of the present invention, the method for manufacturing curved thin plate glass may further include removing the support film. Specifically, after the thin plate glass provided with the support film is elastically deformed to be molded into curved thin plate glass, the support film may be peeled off from the curved thin plate glass. Through this, it is possible to manufacture curved laminated glass in which curved thick plate glass and curved thin plate glass are laminated to each other.

According to an exemplary embodiment of the present invention, the thin plate glass may be provided on the support film through an adhesive film or an adhesive agent. Specifically, the ductile layer and the thin plate glass may be in a state of being adhered to each other through an adhesive film or an adhesive agent. Accordingly, after thin plate glass provided with the support film is elastically deformed, the support film may be easily removed by peeling off the ductile layer from the thin plate glass.

In addition, the ductile layer and the elastic layer included in the support film may be laminated to each other through an adhesive film or an adhesive agent. Specifically, by using an adhesive film or an adhesive agent to bond the ductile layer to the elastic layer, the ductile layer and the elastic layer may be suppressed from being separated from each other during the process of elastically deforming the thin plate glass provided with the support film.

According to an exemplary embodiment of the present invention, the method for manufacturing curved laminated glass may further include heat-treating curved laminated glass in which the curved thick plate glass and the thin plate glass molded into a curved surface are laminated to each other at a temperature of 80° C. to 140° C. Specifically, after the thin plate glass is elastically deformed at room temperature to be laminated to the curved thick plate glass and a support film is removed from the curved thin plate glass, the curved laminated glass may be heat-treated within the above-described temperature range. By heat-treating the curved laminated glass within the above-described temperature range, the lamination strength of curved thin plate glass and curved thick plate glass may be improved and a lamination film or a bonding agent may be prevented from being deformed.

Furthermore, the method for manufacturing curved laminated glass may include a heat-treatment step two times or more. As an example, curved laminated glass may be finally manufactured by heat-treating the curved laminated glass at a temperature of about 90° C., and then heat-treating the curved laminated glass again at a temperature of about 120° C.

According to an exemplary embodiment of the present invention, the ductile layer may have an elastic modulus of 1 MPa to 100 MPa. Specifically, the ductile layer may have an elastic modulus of 10 MPa to 85 MPa, 20 MPa to 60 MPa, 35 MPa to 50 MPa, 1 MPa to 15 MPa, 20 MPa to 35 MPa, 40 MPa to 45 MPa, 55 MPa to 70 MPa, or 80 MPa to 95 MPa. By adjusting the elastic modulus of the ductile layer within the above-described range, the ductile layer may be more closely adhered to the thin plate glass which is elastically deformed to support the thin plate glass during the process of elastically deforming the thin plate glass provided with the support film. Further, during the process of elastically deforming the support film, the ductile layer and the elastic layer may be prevented from being separated from each other.

According to an exemplary embodiment of the present invention, the elastic layer may have an elastic modulus of 60 MPa to 20,000 MPa. Specifically, the elastic layer may have an elastic modulus of 100 MPa to 18,000 MPa, 200 MPa to 15,000 MPa, 500 MPa to 10,000 MPa, 1,000 MPa to 8,000 MPa, 2,000 MPa to 6,000 MPa, 3,000 MPa to 5,000 MPa, 200 MPa to 1,000 MPa, or 2,500 MPa to 5,000 MPa, 7,000 MPa to 10,000 MPa, 12,000 MPa to 15,000 MPa, or 16,000 MPa to 18,000 MPa. By adjusting the elastic modulus of the elastic layer within the above-described range, it is possible to provide a support film capable of effectively supporting the thin plate glass during the process of elastically deforming the thin plate glass provided with a support film.

According to an exemplary embodiment of the present invention, a thickness ratio of the ductile layer to the elastic layer may be 1:0.05 to 1:25. Specifically, a thickness ratio of the ductile layer to the elastic layer may be 1:0.05 to 1:5, 1:6 to 1:10, or 1:12 to 1:25. The thin plate glass which is elastically deformed may be effectively supported by adjusting the thickness ratio of the ductile layer to the elastic layer within the above-described range. Further, during the process of elastically deforming the support film, the ductile layer and the elastic layer included in the support film may be suppressed from being separated from each other.

According to an exemplary embodiment of the present invention, the ductile layer may have a thickness of 0.2 mm to 20 mm. Specifically, the ductile layer may have a thickness of 0.5 mm to 18 mm, 2 mm to 15 mm, 5 mm to 10 mm, 0.5 mm to 2 mm, 5 mm to 10 mm, or 13 mm to 18 mm. By adjusting the thickness of the ductile layer within the above-described range, the ductile layer may be easily adhered to the thin plate glass which is elastically deformed during the process of elastically deforming the thin plate glass provided with the support film. Further, during the process of elastically deforming the thin plate glass provided with the support film, the ductile layer may be suppressed from being fractured.

According to an exemplary embodiment of the present invention, the elastic layer may have a thickness of 1 mm to 5 mm. Specifically, the elastic layer may have a thickness of 1.5 mm to 4.5 mm, 2 mm to 3.5 mm, 2.5 mm to 3 mm, 1.5 mm to 2.5 mm, or 3 mm to 4.5 mm. A support film which is easily elastically deformed may be provided by adjusting the thickness of the elastic layer within the above-described range. Further, during the process of elastically deforming the thin plate glass provided with the support film, the elastic layer may be suppressed from being fractured.

According to an exemplary embodiment of the present invention, as the ductile layer and the elastic layer, materials used in the art may be adopted and used without particular limitation as long as the materials have the above-described elastic moduli. As an example, the ductile layer may include at least one of rubber, silicone, silicone rubber, Viton, polyvinyl chloride, and neoprene.

In addition, the elastic layer may include at least one of polyethylene (PE), polypropylene (PP), polystyrene (PS), polyvinylidene fluoride (PVdF), polytetrafluoroethylene (PTFE), polyethylene terephthalate (PET), polymethylmethacrylate (PMMA), polyacrylonitrile (PAN), polycarbonate (PC), and acrylonitrile butadiene styrene (ABS).

According to an exemplary embodiment of the present invention, the thin plate glass may be deformed into a curved thin plate glass having a radius of curvature of 500 R to 8,000 R during the laminating step. Specifically, curved thin plate glass to be manufactured may have a radius of curvature of 500 R to 2,000 R, 2,500 R to 6,000 R, or 6,500 R to 8,000 R. Curved thin plate glass which is molded by a cold molding method in the related art has a minimum radius of curvature at a level of approximately 2,000 R. Accordingly, the method for manufacturing curved laminated glass according to an exemplary embodiment of the present invention may easily manufacture curved laminated glass including curved thin plate glass having a small radius of curvature as compared to a cold molding method in the related art.

Furthermore, thin plate glass having a double curved surface molded from the thin plate glass may have a radius of curvature of 500 R to 8,000 R. The radius of curvature of the thin plate glass having a double curved surface may be a minimum value of radii of curvature measured at a plurality of points spaced apart at the same distance from the center of the thin plate glass having a double curved surface.

Another exemplary embodiment of the present invention provides curved laminated glass manufactured by the method for manufacturing curved laminated glass.

According to an exemplary embodiment of the present invention, it is possible to provide curved laminated glass which has a small radius of curvature and is lightweight and thinned. Further, the curved laminated glass includes curved thin plate glass which suppresses the buckling or wrinkles from occurring, and thus may have an excellent optical quality.

According to an exemplary embodiment of the present invention, each of the curved thick plate glass, the curved thin plate glass, the lamination film, and the bonding agent included in the curved laminated glass may be the same as curved thick plate glass, curved thin plate glass, a lamination film, and a bonding agent of the method for manufacturing curved laminated glass, respectively.

According to an exemplary embodiment of the present invention, the curved thick plate glass and the thin plate glass laminated to the curved thick plate glass may have a radius of curvature of 500 R to 8,000 R. That is, the curved laminated glass may have a radius of curvature of 500 R to 8,000 R. Further, the curved laminated glass may have a double curved surface shape, and the laminated glass having a double curved surface may have a radius of curvature of 500 R to 8,000 R. The radius of curvature of the laminated glass having a double curved surface may be a minimum value of radii of curvature measured at a plurality of points spaced apart at the same distance from the center of the laminated glass having a double curved surface.

According to an exemplary embodiment of the present invention, the curved thin plate glass is elastically deformed, and compression stress may be formed on a concave surface of the curved thin plate glass, so that the curved laminated glass may have excellent mechanical properties such as impact resistance and durability.

According to an exemplary embodiment of the present invention, a thickness ratio of the curved thick plate glass to the curved thin plate glass may be 1:0.1 to 1:0.5. Specifically, a thickness ratio of the curved thick plate glass to the curved thin plate glass may be 1:0.2 to 1:0.5, 1:0.2 to 1:0.4, 1:0.25 to 1:0.3, or 1:0.25 to 1:0.45. By adjusting the thickness ratio of the curved thick plate glass to the curved thin plate glass to the above-described range, it is possible to effectively prevent an increase in probability of fracture caused by a drop in rigidity of the curved laminated glass. Furthermore, a reduction in weight and thinning of curved laminated glass to be manufactured may be effectively achieved.

FIG. 3 is a view illustrating a result of securing rigidity according to the thickness ratio of curved thick plate glass to curved thin plate glass according to an exemplary embodiment of the present invention. Specifically, FIG. 3 is a view illustrating that an amount of drooping at the center of curved laminated glass is analyzed by applying a predetermined load to the center of the curved laminated glass in a state where four corners of the curved laminated glass according to an exemplary embodiment of the present invention are fixed. In FIG. 3, the x-axis indicates the total thickness of glass, and the y-axis indicates the amount of drooping of glass, that is, a degree to which glass is bent.

According to an exemplary embodiment of the present invention, an asymmetry ratio (AR), which is [a thickness of curved thin plate glass]/[a thickness of curved thick plate glass], may satisfy a range of 0.1 to 0.5. This means that as AR is small, the thickness of the curved thin plate glass becomes small, and the thickness of the curved thick plate glass becomes large. Referring to FIG. 3, rigidity may be secured by adjusting the thickness ratio of the curved thin plate glass to the curved thick plate glass to the above-described range to lower the degree to which the curved laminated glass is bent.

Accordingly, according to an exemplary embodiment of the present invention, it is possible to further improve a rigidity increasing effect, a weight reducing effect, and a thickness reducing effect for the curved laminated glass by adjusting the thickness ratio of the curved thin plate glass to the curved thick plate glass to the above-described range.

According to an exemplary embodiment of the present invention, the curved thin plate glass may have a thickness of 0.3 mm to 1.0 mm. Specifically, the curved thin plate glass may have a thickness of 0.3 mm to 0.8 mm, 0.4 mm to 0.6 mm, 0.3 mm to 0.7 mm, or 0.5 mm to 0.8 mm. Curved laminated glass including curved thin plate glass having a thickness within the above-described range has excellent impact resistance, and simultaneously, may become effectively thinned and lightweight.

According to an exemplary embodiment of the present invention, the curved thick plate glass may have a thickness of 2 mm to 3 mm. Specifically, the curved thick plate glass may have a thickness of 2.5 mm to 3 mm. By adjusting the thickness of the curved thick plate glass within the above-described range, curved laminated glass may become effectively lightweight and thinned, and the impact resistance of curved laminated glass may be suppressed from deteriorating.

Further, the upper limit value and the lower limit value of the thicknesses of the curved thin plate glass and the curved thick plate glass included in the curved laminated glass may be determined by considering that external force and mechanical impact force applied to the curved laminated glass are elastically absorbed.

According to an exemplary embodiment of the present invention, curved laminated glass, which includes the curved thin plate glass and the curved thick plate glass having a thickness within the above-described range, may have a thickness by 50% to 80% and a weight by 50% to 80% as compared to those of existing curved laminated glass in which two sheets of existing soda lime glass having a thickness of about 2.1 mm are laminated. Accordingly, according to an exemplary embodiment of the present invention, it is possible to easily implement curved laminated glass which has a reduced weight and is thinned as compared to existing curved laminated glass.

According to an exemplary embodiment of the present invention, a Vickers hardness ratio of the curved thick plate glass to the curved thin plate glass may be 1:1.1 to 1:1.3. Specifically, a Vickers hardness ratio of the curved thick plate glass to the curved thin plate glass may be 1:1.12 to 1:1.27, 1:1.15 to 1:1.25, or 1:1.2 to 1:1.23. Curved laminated glass including the curved thin plate glass having a higher hardness than that of the curved thick plate glass may have excellent wear resistance, scratch resistance, and durability.

According to an exemplary embodiment of the present invention, the curved thin plate glass may have a Vickers hardness of 5.5 GPa to 7 GPa. Specifically, the curved thin plate glass may have a Vickers hardness of 5.8 GPa to 6.9 GPa, 6.0 GPa to 6.7 GPa, or 6.2 GPa to 6.5 GPa. Curved laminated glass including curved thin plate glass having a Vickers hardness value within the above-described range may have excellent impact resistance, wear resistance, durability, and the like. In addition, manufacturing costs of the curved laminated glass may be reduced. Furthermore, the curved thick plate glass may have a Vickers hardness of 5.2 GPa to 5.8 GPa.

The Vickers hardnesses of the curved thin plate glass and the curved thick plate glass may be calculated by pressing down glass using a Vickers indenter, and then measuring a size of a mark. Specifically, the Vickers hardnesses of the curved thin plate glass and the curved thick plate glass may be measured by setting an indentation load and an indentation maintaining time to 200 gf and 20 seconds, respectively, in accordance with the ASTM C1327-08 standard under the conditions of a temperature at 24° C. and a humidity at 35RH %.

According to an exemplary embodiment of the present invention, a fracture toughness ratio of the curved thick plate glass to the curved thin plate glass may be 1:1.3 to 1:1.5. Specifically, a fracture toughness ratio of the curved thick plate glass to the curved thin plate glass may be 1:1.35 to 1:1.49, 1:1.37 to 1:1.45, or 1:1.39 to 1:1.45. The curved thin plate glass has a fracture toughness within the above-described range as compared to that of the curved thick plate glass and thus may improve fracture resistance of curved laminated glass against external impact and may effectively prevent fracture strength of the curved laminated glass from being reduced.

According to an exemplary embodiment of the present invention, the curved thin plate glass may have a fracture toughness value of 1.0 MPa·m$^{1/2}$ to 1.3 MPa·m$^{1/2}$, Specifically, the curved thin plate glass may have a fracture toughness value of 1.1 MPa·m$^{1/2}$ to 1.25 MPa·m$^{1/2}$, 1.15 MPa·m$^{1/2}$ to 1.25 MPa·m$^{1/2}$, or 1.18 MPa·m$^{1/2}$ to 1.21 MPa·m$^{1/2}$. Curved laminated glass including curved thin plate glass having a fracture toughness value within the above-described range may have excellent impact resistance.

According to an exemplary embodiment of the present invention, the curved thick plate glass may have a fracture toughness value of 0.7 MPa·m$^{1/2}$ to 0.85 MPa·m$^{1/2}$. Specifically, the curved thick plate glass may have a fracture toughness value of 0.75 MPa·m$^{1/2}$ to 0.83 MPa·m$^{1/2}$, or 0.77 MPa·m$^{1/2}$ to 0.8 MPa·m$^{1/2}$.

The fracture toughness values of the curved thin plate glass and the curved thick plate glass may be measured by using an indentation fracture toughness measurement method, which is a method of calculating the fracture toughness value by pressing down the glass with a Vickers indenter until cracks occur on the glass, and then using a crack length, an indenter mark, a load, and the like. Specifically, the fracture toughness values of the curved thin plate glass and the curved thick plate glass may be measured by setting an indentation load to 2 Kgf in accordance with the KS L 1600:2010 standard under the conditions of a temperature at 24° C. and a humidity at 35RH %.

According to an exemplary embodiment of the present invention, an elastic modulus ratio of the curved thick plate glass to the curved thin plate glass may be 1:1.01 to 1:1.2. Specifically, an elastic modulus ratio of the curved thick plate glass to the curved thin plate glass may be 1:1.04 to 1:1.17, 1:1.06 to 1:1.15, 1:1.08 to 1:1.12, or 1:1.08 to 1:1.15. Since the curved thin plate glass has an elastic modulus within the above-described range as compared to that of the curved thick plate glass, the curved laminated glass may have a robust structure even when the curved laminated glass includes curved thin plate glass which is more lightweight and thinner than the curved thick plate glass.

According to an exemplary embodiment of the present invention, the curved thin plate glass may have an elastic modulus of 70 GPa to 90 GPa. Specifically, the curved thin plate glass may have an elastic modulus of 73 GPa to 87 GPa, 75 GPa to 85 GPa, 78 GPa to 80 GPa, 75 GPa to 80 GPa, or 80 GPa to 90 GPa. In addition, the curved thick plate glass may have an elastic modulus of 65 GPa to 75 GPa.

The elastic moduli of the curved thin plate glass and the curved thick plate glass may be measured by a 3 point bending test. Specifically, the elastic moduli of the curved thin plate glass and the curved thick plate glass may be measured by a 3 point bending test using a universal testing machine (UTM) apparatus under the conditions of a temperature at 24° C. and a humidity at 35RH %. More specifically, the elastic modulus may be derived by setting a width and a support span of a sample to 20 mm and 50 mm, respectively, deriving a strain-stress (S-S) curve by converting a displacement and a load measured by the UTM apparatus into a strain and a stress, and then using a slope calculated by linear fitting of the S-S curve.

MODE FOR INVENTION

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to the person with ordinary skill in the art.

EXAMPLE 1

Alkali-free glass including 61 wt % of $SiO_2$, 16 wt % of $Al_2O_3$, 3 wt % of MgO, 8 wt % or less of CaO, and 0.05 wt % of SrO based on 100 wt % of the glass and having a thickness of 0.5 mm was prepared as thin plate glass, and soda lime glass including 72 wt % of $SiO_2$, 0.15 wt % of $Al_2O_3$, 14 wt % of $Na_2O$, 0.03 wt % of $K_2O$, 9 wt % of CaO, and 4 wt % of MgO based on 100 wt % of the glass and having a thickness of 2.0 mm was prepared as thick plate glass. Further, a polyvinyl butyral film having a thickness of 0.5 mm was prepared as a lamination film. The alkali-free glass had an elastic modulus of 78 GPa, a Vickers hardness of 6.3 GPa, and a fracture toughness of 1.20 MPa·m$^{1/2}$, and the soda lime glass had an elastic modulus of 72 GPa, a Vickers hardness of 5.6 GPa, and a fracture toughness of 0.85 MPa·m$^{1/2}$. In addition, a silicone rubber plate having a thickness of 3 mm and an elastic modulus of 50 MPa was prepared as a ductile layer, and a polycarbonate plate having a thickness of 3 mm and an elastic modulus of 230 MPa was prepared as an elastic layer. A support film was manufactured by stacking the ductile layer on the elastic layer.

First, curved thick plate glass was manufactured by heating the thick plate glass at 600° C. for 60 seconds and using a self-weight. The curved thick plate glass molded into a curved surface had a radius of curvature of about 1,200 R. Thereafter, thin plate glass was attached onto the ductile layer of the support film, and a lamination film was attached onto the thin plate glass. Thereafter, the thin plate glass molded into a curved surface was laminated to the curved thick plate glass by positioning the lamination film so as to be adjacent to a concave surface of the curved thick plate glass, and compressing the lamination film with a vacuum ring under the conditions of a temperature at about 20° C. and a pressure at about 10 torr. Thereafter, curved laminated glass was finally manufactured by removing the support film from the curved thin plate glass, primarily heat-treating the curved laminated glass under the conditions of a temperature at about 90° C. and a pressure at 160 torr for 30 minutes, and secondarily heat-treating the curved laminated glass under the conditions of a temperature at about 130° C. and a pressure at 9,800 torr for 60 minutes. It was confirmed that the manufactured curved laminated glass had a radius of curvature of about 1,200 R, and a buckling phenomenon or wrinkles did not occur on the curved thin plate glass included in the curved laminated glass.

EXAMPLE 2

The curved laminated glass was manufactured in the same manner as in Example 1, except that a silicon dioxide plate having a thickness of 30 mm and a radius of curvature of about 1,200 R was prepared as a fracture prevention layer, and the fracture prevention layer was provided on a convex surface of curved thick plate glass having a radius of curvature of about 1,200 R. It was confirmed that the manufactured curved laminated glass had a radius of curvature of about 1,200 R, and a buckling phenomenon or wrinkles did not occur on the curved thin plate glass included in the curved laminated glass.

EXAMPLE 3

The curved laminated glass was manufactured in the same manner as in Example 1, except that a silicone rubber plate having a thickness of 5 mm and an elastic modulus of 30 MPa was prepared as a ductile layer, and an acrylonitrile butadiene styrene plate having a thickness of 5 mm and an elastic modulus of 3,000 MPa was prepared as an elastic layer. It was confirmed that the manufactured curved laminated glass had a radius of curvature of about 1,200 R, and a buckling phenomenon or wrinkles did not occur on the curved thin plate glass included in the curved laminated glass.

Comparative Example 1

The thin plate glass and the thick plate glass, which are the same as those in Example 1, were prepared. Thereafter, curved thick plate glass was manufactured by heating the thick plate glass at 600° C. for 60 seconds and using a self-weight to form the thick plate glass into a curved surface. The curved thick plate glass molded into a curved surface had a radius of curvature of about 1,200 R. Thereafter, a lamination film was attached onto the thin plate glass, and the lamination film was positioned so as to be adjacent to a concave surface of the curved thick plate glass, and compressed with a vacuum ring under the condition of 20° C. and a pressure at 300 torr. In this case, it was confirmed that cracks occurred in the curved thin plate glass molded from the thin plate glass, and it was confirmed that a buckling phenomenon and wrinkles occurred on the surface of the curved thin plate glass.

Therefore, the method for manufacturing curved laminated glass according to an exemplary embodiment of the present invention may manufacture curved laminated glass including curved thin plate glass which suppresses a buckling phenomenon and wrinkles from occurring.

EXPLANATION OF REFERENCE NUMERALS AND SYMBOLS

100: Curved thick plate glass
200: Thin plate glass
210: Curved thin plate glass
300: Support film
310: Ductile layer
320: Elastic layer
400: Fracture prevention layer
500: Lamination film
1000: Curved laminated glass

The invention claimed is:

1. A method for manufacturing curved laminated glass, the method comprises:
providing a curved thick plate glass;
providing a thin plate glass whose thickness is smaller than that of the curved thick plate glass;
stacking a support film comprising a ductile layer and an elastic layer on one surface of the thin plate glass;
positioning a lamination film or a bonding agent between the other surface of the thin plate glass and a concave surface of the curved thick plate glass;
laminating the thin plate glass so as to be aligned with a concave surface of the curved thick plate glass by elastically deforming the thin plate glass provided with the support film; and
removing the support film from the thin plate glass after the laminating step.

2. The method of claim 1, wherein the ductile layer and the elastic layer are sequentially provided on one surface of the thin plate glass.

3. The method of claim 1, wherein the method further comprises providing a fracture prevention layer on a convex surface of the curved thick plate glass.

4. The method of claim 1, wherein the method further comprises heat-treating the curved laminated glass in which the curved thick plate glass and the thin plate glass molded into a curved surface are laminated to each other at a temperature of 80° C. or more to 140° C. or less.

5. The method of claim 1, wherein the thin plate glass is deformed into a curved thin plate glass having a radius of curvature of 500 R or more and 8,000 R or less during the laminating step.

6. The method of claim 1, wherein the thin plate glass has a thickness of 0.3 mm or more and 1.0 mm or less.

7. The method of claim 1, wherein the ductile layer has an elastic modulus of 1 MPa or more and 100 MPa or less.

8. The method of claim 1, wherein the elastic layer has an elastic modulus of 60 MPa or more and 20,000 MPa or less.

9. The method of claim 1, wherein a thickness ratio of the ductile layer to the elastic layer is 1:0.05 to 1:25.

10. The method of claim 1, wherein the ductile layer has a thickness of 0.2 mm or more to 20 mm or less.

11. The method of claim 1, wherein the elastic layer has a thickness of 1 mm or more to 5 mm or less.

12. The method of claim 1, wherein the curved thick plate glass has a single curved surface or a double curved surface.

13. Curved laminated glass manufactured by the method according to claim 1.

14. The curved laminated glass of claim 13, wherein the curved thick plate glass and the thin plate glass laminated to the curved thick plate glass have a radius of curvature of 500 R or more to 8,000 R or less.

15. The curved laminated glass of claim 13, wherein a thickness ratio of the curved thick plate glass to the thin plate glass is 1:0.1 to 1:0.5.

\* \* \* \* \*